March 8, 1938. V. BAILEY 2,110,389
ANIMAL TRAP
Original Filed Sept. 1, 1936
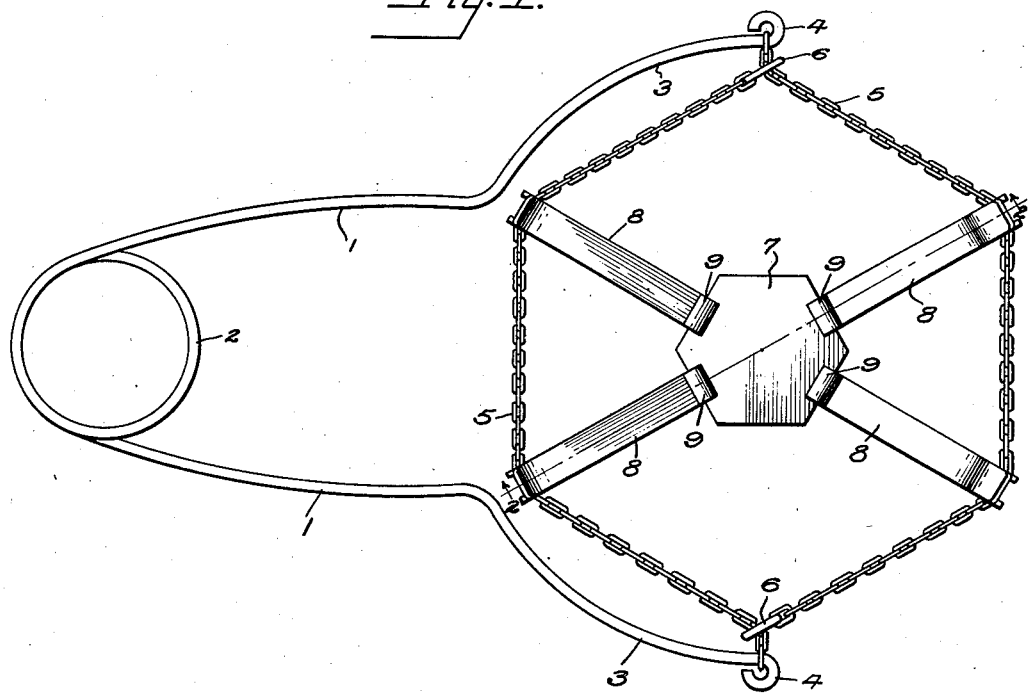
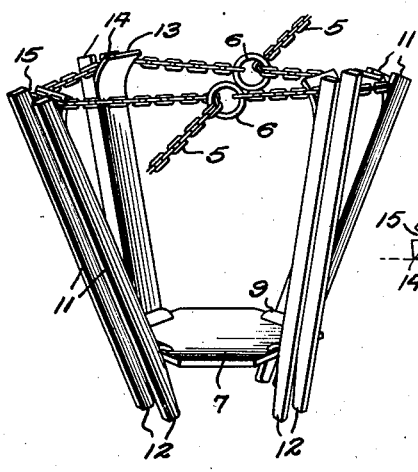
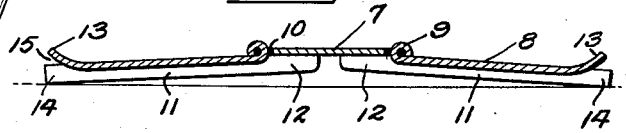
Inventor
Vernon Bailey
By
Attorney Patented Mar. 8, 1938

2,110,389

UNITED STATES PATENT OFFICE 2,110,389

ANIMAL TRAP

Vernon Bailey, Washington, D. C.

Application September 1, 1936, Serial No. 98,940
Renewed January 17, 1938

7 Claims. (Cl. 43—87)

This invention relates to animal traps, and more particularly to that type of traps designed to securely hold the trapped animal without injury or pain, of which general type of traps my prior Patent No. 2,020,598, is a good illustration.

The object of the present invention is to provide an improved and simplified structure lending itself to economical manufacture, and embodying more efficient, positive and facile means for setting the trap, greater compactness and fewer parts than have heretofore been contemplated in traps of this character.

The invention consists in the novel construction, arrangement and combinations of parts as hereafter more particularly described and claimed.

One sheet of drawings accompanies this specification as part thereof, in which like reference characters indicate like parts throughout.

Fig. 1 is a plan view of the improved trap in set position.

Fig. 2 is a cross-section taken on line 2—2 of Fig. 1.

Fig. 3 is a fragmentary view of the noose and trip device, with the latter sprung just prior to the noose leaving the trip.

The invention contemplates the utilization of the conventional tension device used in traps of this character, comprising a spring bar bent intermediate its ends into a coil spring 2, thus providing arms 1—1, which are conveniently bent arcuately adjacent their free ends as at 3, and provided with terminal loops 4. The noose is here illustrated as being formed by two short pieces of chain, 5—5, connected each by one end to the terminal loops 4 of arms 1. Each of these chains is provided on its other end with a ring 6, the ring 6 of one chain sliding upon the other chain and thus forming a noose which under the tension of arms 1—1 is normally drawn close.

The trip device comprises a plate 7 of polygonal shape, which carries a plurality of pivoted radial arms 8, arranged in diametrically disposed pairs and here illustrated as being hinged by having a part of one end bent upwardly as at 9, through a slot 10, provided in plate 7.

Each of the arms 8 is preferably formed from sheet metal of channel formation, the flanges 11—11 of which are severed from the web at each end. The portions of the flanges adjacent the hinge 9 extend beyond the hinge as at 12 to provide stops adapted to engage the under face of the plate 7 when the arms are slightly below the plane of plate 7, so that each oppositely disposed pair of arms constitutes a toggle in conjunction with the plate 7.

The outer or free end of each arm has the web upturned as at 13 thus forming with the ends 14 of the flanges a notch 15 adapted to receive the noose.

In operation the noose is distended by compressing arms 1—1 under tension, and the trip member 7 is then positioned within the noose with the noose positioned in the notches 15 of each of the radial arms and all of the toggles set.

It will be apparent that in this position the arms 1—1 can be released and that the trip will by reason of the toggle construction of the arms hold the noose in open position with the plate 7 slightly elevated.

Upon an animal's foot touching plate 7 the toggle will be broken and the tension of arms 1—1 will draw the noose together, but in so doing it will be apparent that by reason of the noose engagement with notches 15 the radial arms 8 will swing upwardly, carrying the noose so that as the noose closes it also rises and thus prevents the animal's avoiding the noose by lifting its foot as is instinctive.

Various modifications of the structure and arrangement of various parts of the improved trap will readily suggest themselves to those skilled in the art, but all within the scope of the present invention as claimed.

And thus having fully described my invention, I claim:

1. A trap comprising a flexible noose, means tending normally to close the noose and trip means carried by the noose and adapted to shape and guide the noose.

2. A trap comprising a flexible noose, means tending normally to close the noose and combined trip and noose guiding means independent of but carried by the noose.

3. A trap comprising a flexible noose, a tension device tending to close the noose and a trip comprising a plate, a plurality of radially disposed arms pivoted to the plate and means on the arms for engaging the noose.

4. A trap comprising a flexible noose, tension means tending to close the noose and a trip comprising a plurality of diametrically disposed toggle arms adapted to engage the noose in extended form when said toggles are set.

5. A guide and trip for traps of the noose type, comprising a plate, a plurality of arms hinged on said plate, and extending diametrically therefrom, means for limiting the pivotal movement of each arm in one direction and means adjacent the free end of each arm for removably engaging a noose.

6. A guide and trip for traps of the noose type, comprising a polygonal plate having a plurality of slots adjacent and parallel its edges, a plurality of arms, each of channel cross section and having the web separated from the leg parts adjacent each end, that part of the web at one end being passed through a slot in the plate and bent backwards to form a hinge so that the adjacent leg parts project under the plate to constitute stop members, that part of the web at the other end being bent away from the adjacent leg parts to form a noose receiving notch.

7. A guide and trip for traps of the noose type, comprising a plate and a plurality of toggle arms hinged on said plate and extending radially therefrom, each of said arms having means for removably engaging a noose.

VERNON BAILEY.